US011046799B2

(12) United States Patent
Salem et al.

(10) Patent No.: US 11,046,799 B2
(45) Date of Patent: Jun. 29, 2021

(54) HYDROGENATED NITRILE-BUTADIENE-PEG-ACRYLATE CO-POLYMERS

(71) Applicant: ARLANXEO DEUTSCHLAND GMBH, Dormagen (DE)

(72) Inventors: Hiyam Salem, Cologne (DE); Susanna Lieber, Kaiserslautern (DE); Sarah David, Dormagen (DE); Karola Schneiders, Bergisch Gladbach (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 202 days.

(21) Appl. No.: 16/072,375

(22) PCT Filed: Jan. 24, 2017

(86) PCT No.: PCT/EP2017/051359
§ 371 (c)(1),
(2) Date: Jul. 24, 2018

(87) PCT Pub. No.: WO2017/129535
PCT Pub. Date: Aug. 3, 2017

(65) Prior Publication Data
US 2019/0031804 A1    Jan. 31, 2019

(30) Foreign Application Priority Data
Jan. 25, 2016  (EP) ..................... 16152585

(51) Int. Cl.
| C08F 236/06 | (2006.01) |
| C08F 236/12 | (2006.01) |
| C08F 220/20 | (2006.01) |
| C08C 19/02 | (2006.01) |
| C08K 3/34 | (2006.01) |
| C08J 3/24 | (2006.01) |

(52) U.S. Cl.
CPC ............ *C08F 236/06* (2013.01); *C08C 19/02* (2013.01); *C08F 220/20* (2013.01); *C08F 236/12* (2013.01); *C08F 2800/20* (2013.01); *C08J 3/24* (2013.01); *C08K 3/346* (2013.01)

(58) Field of Classification Search
CPC .... C08F 236/12; C08F 236/06; C08F 220/20; C08L 9/02; C08L 15/005
See application file for complete search history.

(56) References Cited

U.S. PATENT DOCUMENTS

| 3,700,637 A | 10/1972 | Finch, Jr. |
| 4,337,329 A | 6/1982 | Kubo et al. |
| 4,384,081 A | 5/1983 | Kubo et al. |
| 4,452,951 A | 6/1984 | Kubo et al. |
| 4,503,196 A | 3/1985 | Rempel et al. |
| 4,581,417 A | 4/1986 | Buding et al. |
| 9,023,914 B2 | 5/2015 | Klimpel et al. |
| 9,868,806 B2 | 1/2018 | Brandau et al. |
| 10,494,467 B2 | 12/2019 | Obrecht et al. |
| 10,544,234 B2 | 1/2020 | Lieber et al. |
| 2004/0225052 A1 | 11/2004 | Bialke et al. |
| 2012/0283351 A1 | 11/2012 | Klimpel et al. |
| 2014/0114026 A1 | 4/2014 | Brandau et al. |
| 2016/0251454 A1 | 9/2016 | Lieber et al. |
| 2016/0257773 A1 | 9/2016 | Obrecht et al. |

FOREIGN PATENT DOCUMENTS

| CN | 1440432 A | 9/2003 | |
| CN | 102498140 A | 6/2012 | |
| DE | 3046008 A1 | 9/1981 | |
| DE | 3046251 A1 | 9/1981 | |
| DE | 3227650 A1 | 3/1983 | |
| DE | 3329974 A1 | 2/1985 | |
| DE | 2539132 A1 | 3/1997 | |
| EP | 0111412 A1 | 6/1984 | |
| EP | 1247835 A1 | 10/2002 | |
| EP | 1852447 A1 | 11/2007 | |
| EP | 2392599 A1 | 12/2011 | |
| EP | 2471851 A1 | 7/2012 | |
| EP | 2868676 A1 | 5/2015 | |
| EP | 2868677 A1 * | 5/2015 | ................ C08L 9/02 |
| EP | 2868677 A1 | 5/2015 | |
| FR | 2540503 A1 | 8/1984 | |
| GB | 1558491 | 1/1980 | |
| JP | 2012031311 A1 | 2/2012 | |
| WO | 02/02657 A2 | 1/2002 | |
| WO | WO-0202657 A2 * | 1/2002 | ......... C09D 155/005 |
| WO | 2015/063162 A1 | 5/2015 | |

* cited by examiner

*Primary Examiner* — Robert D Harlan
(74) *Attorney, Agent, or Firm* — Norris McLaughlin, P.A.

(57) ABSTRACT

The present invention relates to hydrogenated nitrile-butadiene-PEG acrylate copolymers, to the preparation thereof, to vulcanizable mixtures comprising hydrogenated nitrile-butadiene-PEG acrylate copolymers and the preparation thereof, and vulcanizates based on hydrogenated nitrile-butadiene-PEG acrylate copolymer.

15 Claims, No Drawings

HYDROGENATED NITRILE-BUTADIENE-PEG-ACRYLATE CO-POLYMERS

The present invention relates to hydrogenated nitrile-butadiene-PEG acrylate copolymers, to the preparation thereof to vulcanizable mixtures comprising hydrogenated nitrile-butadiene-PEG acrylate copolymers and the preparation thereof, and vulcanizates based on hydrogenated nitrile-butadiene-PEG acrylate copolymer.

Nitrile-butadiene copolymer (nitrile rubber, also abbreviated to "NBR") is understood to mean rubbers which are co-, ter- or quaterpolymers of at least one α,β-ethylenically unsaturated nitrile, at least one conjugated diene and optionally one or more additional copolymerizable monomers. This explicitly also includes partly or fully hydrogenated nitrile-butadiene copolymer ("HNBR"). Hydrogenated nitrile-butadiene copolymer is understood to mean corresponding co-, ter- or quaterpolymers in which all or some of the sum total of the C=C double bonds of the copolymerized diene units have been hydrogenated.

For many years, both NBR and HNBR have occupied an established position in the specialty elastomers sector. They possess an excellent profile of properties, in the form of excellent oil resistance, good heat stability and excellent resistance to ozone and chemicals, the latter being even more pronounced in the case of HNBR than in the case of NBR. NBR and HNBR also have very good mechanical and performance properties. For this reason, they are widely used in a wide variety of different fields of use, and are used, for example, for production of gaskets, hoses and damping elements in the automotive sector, and also for stators, well seals and valve seals in the oil production sector, and also for numerous parts in the electrical industry, mechanical engineering and shipbuilding.

One of the use for HNBR is seals.

Seals based on HNBR are generally used in areas where they come into contact with fuels or lubricants. Therefore, suitable rubbers for such applications are only those which have swelling, measured in Fuel C, of 50% or less, preferably up to 45% or less and more preferably up to 43% or less.

Particularly in the automotive sector, the components in vehicles used globally are subject to low temperatures, frequently in the region below −20° C., where the materials should still have good integrity and flexibility. A measure of low-temperature flexibility is the TR 10 measurement, wherein that temperature at which a sample extended by 50%, after freezing, recovers again by 10%, i.e. has flexibility, is determined. Therefore, it is desirable that the material has vary good low-temperature flexibility, expressed by a TR10 of −25° C. or less, preferably −29° C. or less and more preferably −30° C. or less.

Seals are used in order to suitably seal regions with respect to one another. A distinction is made here between dynamic and static seals. A particularly important factor for the success of a seal is the sealing power over a wide temperature range, which is generally measured with the compression set (CS). It is therefore desirable that the seal still have adequate sealing after temperature variations between −20° C. and RT (ca. 23° C.), and so the material should have a CS at −20° C. of 50% or less, preferably 30% or less and more preferably 20% or less.

In order that an HNBR is suitable for the abovementioned demands, what is required is thus a balanced ratio of all three parameters mentioned.

A multitude of different HNBR types are commercially available, and these feature, according to the application sector, different monomers, molecular weights, polydispersities and mechanical and physical properties. As well as the standard types, there is increasing demand particularly for specialty types featuring contents of specific termonomers or particular functionalizations.

Known specific termonomers are, for example, carboxylic acids (including acrylic acid and methacrylic acid). Terpolymers having these termonomers are referred to collectively as HXNBR where the "X" represents the acid group. These also include dicarboxylic monoesters (including monomethyl maleate or monobutyl maleate).

Likewise known are terpolymers having carboxylic ester monomers (including methyl acrylate and butyl acrylate).

EP-A-1852447 discloses a highly saturated terpolymer rubber containing nitrile groups, having 10% to 40% by weight of α,β-ethylenically unsaturated nitrile units, 10% to 60% by weight of α,β-ethylenically unsaturated carboxylic ester units, for example butyl acrylate and ethylhexyl acrylate, and 20% to 70% by weight of a conjugated diene unit, which has a vulcanizate having balanced properties. The explicitly disclosed examples have HNBR terpolymer with butyl acrylate units having a TR 10 of down to −41° C. There is no disclosure with regard to swelling characteristics in Fuel C and with regard to the compression set of the terpolymers. Polyethylene glycol acrylates (PEG acrylates) are not disclosed explicitly as α,β-ethylenically unsaturated carboxylic ester units.

EP-A-1247635 discloses a highly saturated copolymer containing nitrile groups and containing (a) 10% to 40% by weight of α,β-ethylenically unsaturated nitrile units, (b) 10% to 60% by weight of α,β-ethylenically unsaturated carboxylic ester units, (c) 0.01% to 21% by weight of conjugated diene units and 14% to 69.99% by weight of saturated conjugated diene units, where the sum total of the monomer units (c) and (d) is 20% to 70% by weight and the ratio of the monomer units (d)/[(c)+(d)] is at least 70% by weight and the difference between the extrapolated starting temperature of the glass transition (Tlg) and the extrapolated end temperature of the glass transition (Teg) is not greater than 10° C. Vulcanized products of the copolymer rubber have good cold stability and oil resistance, and good dynamic properties. No explicit working examples of HNBR terpolymers having 10% to 25% by weight of PEG acrylate units are disclosed.

Moreover, EP-A-1243602 discloses a terpolymer containing (a) 0% to 20% by weight of 1,3-butadiene units, (b) 0% to 50% by weight of saturated 1,3-butadiene units, (c) 40% to 50% by weight of α,β-ethylenicaliy unsaturated nitrile units, and (d) 10% to 35% by weight and at least 8 mol % of other monomer units, where the sum total of the 1,3-butadiene units (a) and the saturated 1,3-butadiene units (b) is in the range from 30% to 50% by weight. The other monomer unit may include unsaturated carboxylic esters. This highly saturated copolymer rubber containing nitrile groups has good oil resistance in the vulcanized product. No explicit HNBR terpolymers having hydrogenated PEG acrylate units are disclosed. There are only explicit examples with butyl acrylate.

Additionally known are nitrile-butadiene copolymers having alkoxyalkyl carboxylate monomers.

EP-A-2868677 discloses a copolymer containing nitrile groups and having 1% to 9% by weight of monocarboxylic monoester units having a glass transition temperature of less than −20° C. and oil swelling of less than 20%. Therein are explicitly terpolymers having 4.8% by weight and 7.7% by weight of methoxyethyl acrylate, i.e. PEG-1 acrylate, and having 4.1% by weight of PEG-5 methacrylate. EP-A-2868277 does not disclose any information with regard to compression set, TR 10 and swelling in Fuel C.

Li et al. discloses, in J. Polym. Res. 2012, 19, 9853, the graft polymerization of polyethylene glycol monoalkyl ethers onto XNBR. The graft polymerization of the polyethylene glycol monoalkyl ethers lowers the glass transition temperature. The chain length of the polyethylene glycol ether is not specified more accurately. No information can be found with regard to swelling in Fuel C, TR 10 and compression set characteristics of vulcanizates.

EP-A-2868678 discloses a copolymer containing nitrile groups and having 1% to 9% by weight of α,β-ethylenically unsaturated monomer units containing carbonyl groups. Explicit examples disclosed are hydrogenated terpolymers having PEG-11 monomers.

Terpolymers are frequently insufficient for more exact setting of the desired polymer properties. Quaternary polymers, i.e. polymers composed of four monomer units, are finding increasing use. There are known quaterpolymers comprising carboxylic acids and carboxylic esters.

EP-A-2392599 discloses an at least partly hydrogenated nitrile-butadiene copolymer containing 5% to 60% by weight of α,β-ethylenically unsaturated nitrile units, 20% to 83.9% by weight of conjugated diene units, 0.1% to 20% by weight of dicarboxylic monoester monomer units, 11% to 50% by weight of alkoxyalkyl (meth)acrylate units having 2 to 8 carbon atoms. Table 2 describes, inter alia, quaterpolymers having a to acrylonitrile content of 21.3% or 24.8% by weight, 46.6% or 47.3% by weight of butadiene, 4.5% to 5% by weight of mono-n-butyl acrylate and 23.0% or 27.1% by weight of methoxyethyl acrylate. The vulcanizates which are produced from these hydrogenated nitrile-butadiene copolymers have good TR10 values, but there is no reference to swelling characteristics in Fuel C and no compression set at low temperatures is disclosed. HNBR terpolymers having polyethylene glycol acrylate units are not disclosed explicitly. There is also no disclosure of any terpolymer consisting of acrylonitrile, butadiene and PEG-1 acrylate.

JP-A-2012-031311 describes a highly saturated copolymer rubber containing nitrile groups and containing (a) 10.0% to 40.0% by weight of α,β-ethylenically unsaturated nitrile units, (b) 5.5% to 10.0% by weight of α,β-ethylenically unsaturated dicarboxylic monoester units, (c) 11.0% to 30.0% by weight of alkoxyalkyl (meth)acrylate units having alkoxyalkyl groups having 2 to 8 carbon atoms, and (d) 20.0% to 73.5% by weight of conjugated diene units, where at least some of the conjugated diene units are hydrogenated. HNBR terpolymers having polyethylene glycol acrylate units are not disclosed explicitly.

The choice of monomer or monomers thus has a crucial influence on the polymer properties and is not directly predictable.

The hydrogenated nitrile-butadiene-acrylate copolymers known to date do not satisfactorily meet the demand for minimum swelling in Fuel C, very good low-temperature flexibility (TR 10) and simultaneously low compression set (CS). Therefore, the known terpolymers are still unsatisfactory for seals having high demands.

Accordingly, the problem addressed by the present invention was that of providing a nitrile-butadiene copolymer having vulcanizates that have excellent low-temperature stability (determined by TR 10) of −25° C. or less, preferably −30° C. or less, more preferably −34° C. or less, a compression set at −20° C. of 50% or less, preferably 30% or less, more preferably 20% or less, and good chemical resistance (determined by the swelling in Fuel C) of 50% or less, 45% or less, or 43% or less, which overcomes the disadvantages of the prior art. In addition, it is desirable that the nitrile-butadiene copolymer provided has improved ageing properties.

The solution to the problem and the subject-matter of the present invention is a hydrogenated nitrile-butadiene-PEG acrylate copolymer containing a) 25% to 38% by weight, preferably 27% to 37% by weight and more preferably 29% to 36% by weight of at least one α,β-ethylenically unsaturated nitrile unit, b) 40% to 60% by weight, preferably 42% to 58% by weight and more preferably 44% to 56% by weight of at least one conjugated diene unit and c) 10% to 25% by weight, preferably 11% to 22% by weight and more preferably 12% to 20% by weight of at least one PEG acrylate unit derived from a PEG acrylate of the general formula (I)

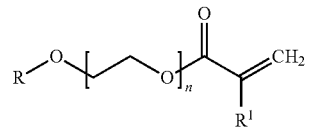

Formula (I)

where

R is hydrogen or branched or unbranched $C_1$-$C_{20}$-alkyl, preferably methyl, ethyl, butyl or ethylhexyl, n is 1 to 8, preferably 2 to 8, more preferably 2 to 5 and most preferably 3 and $R^1$ is hydrogen or $CH_3$—, where the hydrogenated nitrile-butadiene-PEG acrylate copolymer, if n is 1, does not contain any further copolymerizable monomer unit having a free carboxylic acid group.

In the embodiment of the invention, at least some of the conjugated diene units have been hydrogenated. Preferably, the level of hydrogenation is 50% or more, more preferably 90% or more, most preferably 99% or more.

It should be noted at this point that the scope of the invention includes any and all possible combinations of the components, ranges of values and/or process parameters mentioned above and cited hereinafter, in general terms or within areas of preference.

The term "nitrile-butadiene-PEG acrylate copolymer" in the context of this invention concerns a copolymer containing at least one α,β-ethylenically unsaturated nitrile monomer unit, at least one conjugated diene monomer unit and at least one PEG acrylate unit derived from a PEG acrylate of the general formula (I).

The term copolymer encompasses polymers having more than one monomer unit. In one embodiment of the invention, the copolymer is derived exclusively, for example, from the three monomer types (a), (b) and (c) described, and is therefore a terpolymer. The term "copolymer" likewise encompasses, for example, additionally quaterpolymers, derived from the three monomer types (a), (b) and (c) described and a further monomer unit (d).

α,β-Ethylenically Unsaturated Nitrile

The α,β-ethylenically unsaturated nitrile used, which forms the α,β-ethylenically unsaturated nitrile units (a), may be any known α,β-ethylenically unsaturated nitrile. Preference is given to ($C_3$-$C_5$)-α,β-ethylenically unsaturated nitriles such as acrylonitrile, α-haloacrylnitrile, for example α-chloroacrylnitrile and α-bromoacrylnitrile, α-alkylacrylonitrile, for example methacrylonitrile, ethacrylonitrile or mixtures of two or more α,β-ethylenically unsaturated nitriles. Particular preference is given to acrylonitrile, methacrylonitrile, ethacrylonitrile or mixtures thereof. Very particular preference is given to acrylonitrile.

The amount of α,β-ethylenically unsaturated nitrile units (a) is typically in the range from 25% to 38% by weight, preferably 27% to 37% by weight, more preferably from 29% to 36% by weight, based on the total amount of 100% by weight of all the monomer units.

Conjugated Diene

The conjugated diene, which forms the conjugated diene unit (b), may be of any type, especially conjugated $C_4$-$C_{12}$ dienes. Particular preference is given to 1,3-butadiene, isoprene, 2,3-dimethylbutadiene, 1,3-pentadiene (piperylene) or mixtures thereof. Especially preferred are 1,3-butadiene and isoprene or mixtures thereof. Very particular preference is given to 1,3-butadiene.

The amount of conjugated diene is typically in the range from 40% to 60% by weight, preferably 42% to 58% by weight and more preferably 44% to 56% by weight, based on the total amount of 100% by weight of all the monomer units.

PEG Acrylate

In addition to the α,β-ethylenically unsaturated nitrile units and the conjugated diene units, the hydrogenated nitrile-butadiene-PEG acrylate copolymer contains, as a third unit, at least one PEG acrylate unit derived from PEG acrylates of the general formula (I)

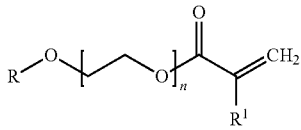

Formula (I)

where

R is hydrogen or branched or unbranched $C_1$-$C_{20}$-alkyl, preferably methyl, ethyl, butyl or ethylhexyl, n is 1 to 8, preferably 2 to 8, more preferably 2 to 5 and most preferably 3 and $R^1$ is hydrogen or $CH_3$—.

The term "(meth)acrylate" in the context of this invention represents "acrylate" and "methacrylate". When the $R^1$ radical in the general formula (I) is $CH_3$—, the molecule is a methacrylate.

The term "polyethylene glycol" or the abbreviation "PEG" in the context of this invention represents both monoethylene glycol sections having one repeat ethylene glycol unit (PEG-1; n=1) and polyethylene glycol sections having 2 to 8 repeat ethylene glycol units (PEG-2 to PEG-8; n=2 to 8).

The term "PEG acrylate" is also abbreviated to PEG-X-(M)A where "X" represents the number of repeat ethylene glycol units, "MA" represents methacrylate and "A" represents acrylate.

Acrylate units derived from PEG acrylates of the general formula (I) are referred to in the context of this invention as "PEG acrylate unit".

Preferred PEG acrylate units are derived from the PEG acrylates of the following formulae no. 1 to no. 10, where n is 1, 2, 3, 4, 5, 6, 7 or 8, preferably 2, 3, 4, 5, 6, 7 or 8, more preferably 3, 4, 5, 6, 7 or 8 and most preferably 3:

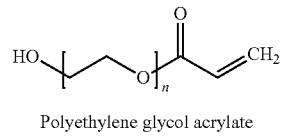

Polyethylene glycol acrylate (Formula no. 1)

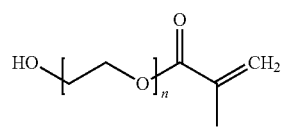

Polyethylene glycol methacrylate (Formula no. 2)

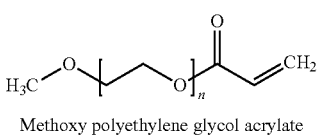

Methoxy polyethylene glycol acrylate (Formula no. 3)

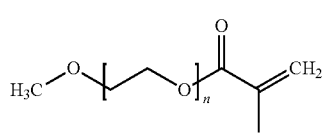

Methoxy polyethylene glycol methacrylate (Formula no. 4)

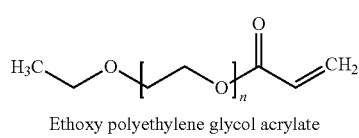

Ethoxy polyethylene glycol acrylate (Formula no. 5)

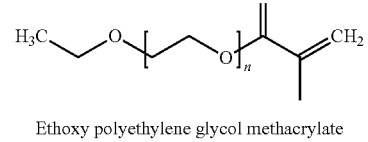

Ethoxy polyethylene glycol methacrylate (Formula no. 6)

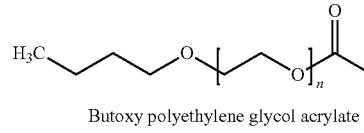

Butoxy polyethylene glycol acrylate (Formula no. 7)

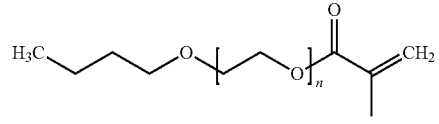

Butoxy polyethylene glycol methacrylate (Formula no. 8)

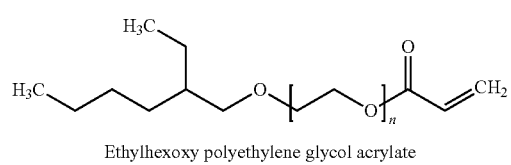

Ethylhexoxy polyethylene glycol acrylate (Formula no. 9)

(Formula no. 10)

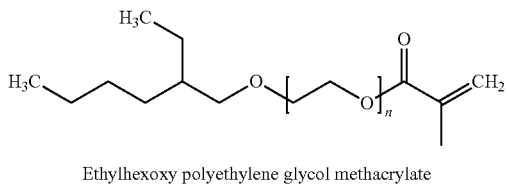

Ethylhexoxy polyethylene glycol methacrylate

Other commonly used names for methoxy polyethylene glycol acrylate (formula no. 3) are, for example, poly(ethylene glycol) methyl ether acrylate, acryloyl-PEG, methoxy-PEG acrylate, methoxy poly(ethylene glycol) monoacrylate, poly(ethylene glycol) monomethyl ether monoacrylate or mPEG acrylate.

These PEG acrylates can be purchased commercially, for example from Arkema under the Sartomer® trade name, from Evonik under the Visiomer® trade name, or from Sigma Aldrich.

The amount of the PEG acrylate units in copolymers of the invention is in the range from 10% to 25% by weight, preferably 11% to 22% by weight and more preferably 12% to 20% by weight, based on the total amount of 100% by weight of all the monomer units.

In a preferred hydrogenated nitrile-butadiene-PEG acrylate copolymer of the invention, the α,β-ethylenically unsaturated nitrile unit (a) is derived from acrylonitrile or methacrylonitrile, more preferably from acrylonitrile, the conjugated diene unit (b) from isoprene or 1,3-butadiene, more preferably from 1,3-butadiene, and the PEG acrylate unit (c) is derived from PEG acrylate of the general formula (I) where n is 3 to 8, more preferably from PEG acrylate of the general formula (I) with n=3.

In addition, the hydrogenated nitrile-butadiene-PEG acrylate copolymer may contain one or more further copolymerizable monomers in an amount of 0.1% by weight to 10% by weight, preferably 0.1% by weight to 5% by weight, based on the total amount of 100% by weight of all monomer units. In that case, the amounts of the other monomer units are reduced in a suitable manner, such that the sum total is always 100% by weight. Further copolymerizable monomers which may be used are, for example,

- aromatic vinyl monomers, preferably styrene, α-methylstyrene and vinylpyridine,
- fluorinated vinyl monomers, preferably fluoroethyl vinyl ether, fluoropropyl vinyl ether, o-fluoromethylstyrene, vinyl pentafluorobenzoate, difluoroethylene and tetrafluoroethylene, or else
- α-olefins, preferably $C_2$-$C_{12}$ olefins, for example ethylene, 1-butene, 4-butene, 4-methyl-1-pentene, 1-hexene or 1-octene,
- non-conjugated dienes, preferably $C_4$-$C_{12}$ dienes such as 1,4-pentadiene, 1,4-hexadiene, 4-cyanocyclohexene, 4-vinylcyclohexene, vinylnorbornene, dicyclopentadiene or else
- alkynes such as 1- or 2-butyne,
- α,β-ethylenically unsaturated monocarboxylic acids, preferably acrylic acid, methacrylic acid, crotonic acid or cinnamic acid,
- α,β-ethylenically unsaturated monocarboxylic acid esters, preferably butyl acrylate,
- α,β-ethylenically unsaturated dicarboxylic acids, preferably maleic acid, fumaric acid, citraconic add, itaconic acid,
- α,β-ethylenically unsaturated dicarboxylic acid monoesters, for example
    - alkyl, especially $C_4$-$C_{18}$-alkyl, preferably n-butyl, tert-butyl, n-pentyl or n-hexyl, more preferably mono-n-butyl maleate, mono-n-butyl fumarate, mono-n-butyl citraconate, mono-n-butyl itaconate;
    - alkoxyalkyl, especially $C_4$-$C_{16}$-alkoxyalkyl, preferably $C_4$-$C_{12}$-alkoxyalkyl,
    - hydroxyalkyl, especially $C_4$-$C_{18}$-hydroxyalkyl, preferably $C_4$-$C_{12}$-hydroxyalkyl,
    - cycloalkyl, especially $C_5$-$C_{18}$-cycloalkyl, preferably $C_6$-$C_{12}$-cycloalkyl, more preferably monocyclopentyl maleate, monocyclohexyl maleate, monocycloheptyl maleate, monocyclopentyl fumarate, monocyclohexyl fumarate, monocycloheptyl fumarate, monocyclopentyl citraconate, monocyclohexyl citraconate, monocycloheptyl citraconate, monocyclopentyl itaconate, monocyclohexyl itaconate and monocycloheptyl itaconate,
    - alkylcycloalkyl, especially $C_6$-$C_{12}$-alkylcycloalkyl, preferably $C_7$-$C_{10}$-alkylcycloalkyl, more preferably monomethylcyclopentyl maleate and monoethylcyclohexyl maleate, monomethylcyclopentyl fumarate and monoethylcyclohexyl fumarate, monomethylcyclopentyl citraconate and monoethylcyclohexyl citraconate, monomethylcyclopentyl itaconate and monoethylcyclohexyl itaconate;
    - aryl, especially $C_6$-$C_{14}$-aryl, monoester, preferably monoaryl maleate, monoaryl fumarate, monoaryl citraconate or monoaryl itaconate, more preferably monophenyl maleate or monobenzyl maleate, monophenyl fumarate or monobenzyl fumarate, monophenyl citraconate or monobenzyl citraconate, monophenyl itaconate or monobenzyl itaconate or mixtures thereof,
- unsaturated polyalkyl polycarboxylates, for example dimethyl maleate, dimethyl fumarate, dimethyl itaconate or diethyl itaconate; or
- α,β-ethylenically unsaturated carboxylic esters containing amino groups, for example dimethylaminomethyl acrylate or diethylaminoethyl acrylate
- copolymerizable antioxidants, for example N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline, N-phenyl-4-(4-vinylbenzyloxy)aniline or
- crosslinkable monomers, for example divinyl components, for example divinylbenzene; di(meth)acrylic esters, for example ethylene glycol di(meth)acrylate, diethylene glycol di(meth)acrylate, butanediol di(meth)acrylate or polyethylene glycol di(meth)acrylate, or tri(meth)acrylic esters, for example trimethylolpropane tri(meth)acrylate; self-crosslinkable monomers, for example N-methylol(meth)acrylamide or N,N'-dimethylol(meth)acrylamide.

Some further copolymerizable monomers affect the physical properties of the hydrogenated nitrile-butadiene-PEG acrylate copolymer of the invention.

Copolymerized monomer units having at least one free carboxylic acid group, for example acrylic acid, methacrylic acid, ethylenically unsaturated dicarboxylic monoesters or ethylenically unsaturated dicarboxylic acids, generally lead to a deterioration in the ageing properties. As a result of free acid groups in the polymer, a drop in extension after ageing at elevated temperatures was detectable. At the same time, a rise in the glass transition temperature was observable, which has adverse effects on the demand for excellent low-temperature flexibility which has been made here. The effect on the ageing properties depends upon factors including the length of the copolymerized PEG acrylate unit, with particular deterioration in the ageing properties especially in the case of a copolymerized PEG-1 unit, i.e. in the case of PEG acrylate units derived from (alkoxy) monoethylene glycol (meth)acrylate.

In one embodiment, the hydrogenated nitrile-butadiene-PEG acrylate copolymer of the invention contains, aside from the α,β-ethylenically unsaturated nitrile unit, the conjugated diene unit and the PEG acrylate unit derived from a PEG acrylate of the general formula (I) where n is 1, no monomer units having a free carboxylic acid group.

Even more preferably, the hydrogenated nitrile-butadiene-PEG acrylate copolymer contains, aside from the α,β-ethylenically unsaturated nitrile unit, the conjugated diene unit and the PEG acrylate unit derived from a PEG acrylate of the general formula (I), no monomer units having a free carboxylic acid group.

Most preferably, the hydrogenated nitrile-butadiene-PEG acrylate copolymer contains, aside from the α,β-ethylenically unsaturated nitrile unit, the conjugated diene unit and the PEG acrylate unit derived from a PEG acrylate of the general formula (I), no further monomer units. This means that this embodiment consists solely of α,β-ethylenically unsaturated nitrile units, conjugated diene units and PEG acrylate units derived from a PEG acrylate of the general formula (I).

In an alternative embodiment, the hydrogenated nitrile-butadiene-PEG acrylate copolymer comprises 25% to 27% by weight acrylonitrile and 21% to 23% by weight PEG-3-acrylate.

In an alternative embodiment, the hydrogenated nitrile-butadiene-PEG acrylate copolymer comprises 35% to 37% by weight acrylonitrile and 11% to 14% by weight PEG-3-acrylate.

In an alternative embodiment, the hydrogenated nitrile-butadiene-PEG acrylate copolymer comprises 29% to 32% by weight acrylonitrile and 11% to 15% by weight Butyl-PEG-2-acrylate (Butyl-diethylene glycol methacrylate) or PEG-3-acrylate.

The hydrogenated nitrile-butadiene-PEG acrylate copolymer of the invention typically has a number-average molecular weight (Mn) of 10 000 to 2 000 000 g/mol, preferably 50 000 to 1 000 000 g/mol, more preferably 100 000 to 500 000 g/mol and most preferably 150 000 to 300 000 g/mol.

The hydrogenated nitrile-butadiene-PEG acrylate copolymer of the invention typically has a polydispersity index (PDI=$M_w/M_n$ where $M_w$ is the weight-average molecular weight) of 1.5 to 6, preferably 2 to 5 and more preferably 2.5 to 4.

The hydrogenated nitrile-butadiene-PEG acrylate copolymer of the invention typically has a Mooney viscosity (ML1+4@100° C.) of 10 to 150, preferably of 20 to 120 and more preferably of 25 to 100.

The hydrogenated nitrile-butadiene-PEG acrylate copolymer of the invention is characterized in that
  TR 10, measured by the ISO 2921:2005 test method, has a value of −25° C. or less, preferably a value of −30° C. or less and more preferably a value of −34° C. or less, and
  swelling in Fuel C, measured to DIN ISO 1817, has a value of 50% or less, preferably a value of 45% or less and more preferably a value of 43% or less, and
  compression set (CS), measured at −20° C. by the DIN ISO 815-2 test method, has a value of 50% or less, preferably a value of 30% or less and more preferably a value of 20% or less.

Process for Preparing Nitrile-Butadiene-PEG Acrylate Copolymers

The invention further provides a process for preparing nitrile-butadiene-PEG acrylate copolymers, characterized in that at least one α,β-ethylenically unsaturated nitrile, at least one conjugated diene and at least one PEG acrylate of the general formula (I) are subjected to an emulsion polymerization.

The preparation of the nitrile-butadiene-PEG acrylate copolymers required for the hydrogenation by polymerization of the aforementioned monomers has been described extensively in the literature (e.g. Houben-Weyl, Methoden der Organischen Chemie [Methods of Organic Chemistry], vol. 14/1, 30 Georg Thieme Verlag Stuttgart 1961) and is not particularly restricted. In general, the process is one in which α,β-ethylenically unsaturated nitrile units, conjugated diene units and PEG acrylate units are copolymerized as desired. The polymerization process used may be any known emulsion polymerization process, suspension polymerization process, bulk polymerization process and solution polymerization process. Preference is given to the emulsion polymerization process. Emulsion polymerization is especially understood to mean a process known per se in which the reaction medium used is usually water (see, inter alia, Römpp Lexikon der Chemie [Römpp's Chemistry Lexicon], volume 2, 10th edition 1997; P. A. Lovell, M. S. El-Aasser, Emulsion Polymerization and Emulsion Polymers, John Wiley & Sons, ISBN: 0471 96746 7; H. Gerrens, Fortschr. Hochpolym. Forsch. 1, 234 (1959)). The incorporation rate of the termonomer can be adjusted directly by the person skilled in the art, such that an inventive terpolymer is obtained. The monomers can be initially charged or converted by incrementation in a number of steps.

The present invention thus also provides nitrile-butadiene-PEG acrylate copolymers containing
  a) 25% to 38% by weight, preferably 27% to 37% by weight and more preferably 29% to 36% by weight of at least one α,β-ethylenically unsaturated nitrile unit,
  b) 40% to 60% by weight, preferably 42% to 58% by weight and more preferably 44% to 56% by weight of at least one conjugated diene unit and
  c) 10% to 25% by weight, preferably 11% to 22% by weight and more preferably 12% to 20% by weight of at least one PEG acrylate unit derived from a PEG acrylate of the general formula (I)

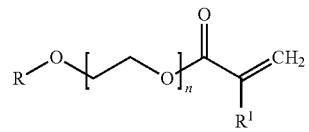

Formula (I)

where
  R is hydrogen or branched or unbranched $C_1$-$C_{20}$-alkyl, preferably methyl, ethyl, butyl or ethylhexyl,
  n is 1 to 8, preferably 2 to 8, more preferably 2 to 5 and most preferably 3 and
  $R^1$ is hydrogen or $CH_3$—,
where the nitrile-butadiene-PEG acrylate copolymer, if n is 1, does not contain any further copolymerizable monomer unit having a free carboxylic acid group.

Metathesis

It is also possible that the preparation of the nitrile-butadiene-PEG acrylate copolymer is followed by a metathesis reaction to reduce the molecular weight of the nitrile-butadiene-PEG acrylate copolymer or a metathesis reaction and a subsequent hydrogenation, or a hydrogenation only. These metathesis or hydrogenation reactions are sufficiently well-known to those skilled in the art and are described in the literature. Metathesis is known, for example, from WO-A-02/100941 and WO-A-02/100905 and can be used to reduce the molecular weight.

Process for Preparing Hydrogenated Nitrile-Butadiene-PEG Acrylate Copolymers

The invention also provides a process for preparing hydrogenated nitrile-butadiene-PEG acrylate copolymers, characterized in that at least one $\alpha,\beta$-ethylenically unsaturated nitrile, at least one conjugated diene and at least one PEG acrylate of the general formula (I) are subjected to an emulsion polymerization and then hydrogenated.

After the copolymerization of the nitrile-butadiene-PEG acrylate copolymers, they are at least partly hydrogenated (hydrogen addition reaction). In the at least partly hydrogenated nitrile-butadiene copolymers, at least some of the C=C double bonds of the repeat unit derived from the conjugated diene have been specifically hydrogenated. The level of hydrogenation of the conjugated diene units (b) in hydrogenated nitrile-butadiene-PEG acrylate copolymers of the invention is 50% or more, preferably 90% or more and more preferably 99% or more.

The term "hydrogenated nitrile-butadiene-PEG acrylate copolymer" in the context of this invention thus concerns a copolymer containing at least one $\alpha,\beta$-ethylenically unsaturated nitrile monomer unit, at least one conjugated diene monomer unit and at least one PEG acrylate unit derived from a PEG acrylate of the general formula (I), which has been hydrogenated to an extent of 50% or more, preferably 90% or more and more preferably 99% or more.

The hydrogenation of nitrile-butadiene copolymers is known, for example from US-A-3 700 637, DE-A-2 539 132, DE-A-3 046 008, DE-A-3 046 251, DE-A-3 227 650, DE-A-3 329 974, EP-A-111 412, FR-B 2 540 503. Hydrogenated nitrile-butadiene copolymers are notable for high breaking strength, low abrasion, consistently low deformation after pressure and tensile stress, and good oil resistance, but in particular for remarkable stability against thermal and oxidative influences.

Vulcanizable Mixtures Comprising Hydrogenated Nitrile-Butadiene-PEG Acrylate Copolymers The present invention further provides vulcanizable mixtures comprising the hydrogenated nitrile-butadiene-PEG acrylate copolymer of the invention and at least one crosslinker. A preferred embodiment concerns vulcanizable mixtures which additionally comprise at least one filler.

Other Optional Components:

Optionally, vulcanizable mixtures of this kind may also comprise one or more familiar additives and fibrous materials to the person skilled in the art for rubbers. These include ageing stabilizers, reversion stabilizers, light stabilizers, antiozonants, processing aids, plasticizers, mineral oils, tackifiers, blowing agents, dyes, pigments, waxes, resins, extenders, fillers, carbon blacks, silicas, fumed silicas, graphene, carbon nanotubes, natural materials, for example alumina, kaolins, wollastonite, organic acids, vulcanization retardants, metal oxides, aramid fibres, salts of unsaturated carboxylic acids, for example zinc diacrylate (ZDA), zinc methacrylates (ZMA) and zinc dimethylacrylate (ZDMA), liquid acrylates, and further filler-activators, for example triethanolamine, trimethylolpropane, polyethylene glycol, hexanetriol, aliphatic trialkoxysilanes or other additives known in the rubber industry (Ullmann's Encyclopedia of Industrial Chemistry, VCH Verlagsgesellschaft mbH, D-69451 Weinheim, 1993, vol A 23 "Chemicals and Additives", p. 366-417).

The total amount of additives and fibrous materials is typically in the range from 1 to 300 phr.

Useful crosslinkers include, for example, peroxidic crosslinkers such as bis(2,4-dichlorobenzyl) peroxide, dibenzoyl peroxide, bis(4-chlorobenzoyl) peroxide, 1,1-bis(t-butylperoxy)-3,3,5-trimethylcyclohexane, tert-butyl perbenzoate, 2,2-bis(t-butylperoxy)butene, 4,4-di-tert-butyl peroxynonylvalerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)hex-3-yne.

It may be advantageous to use, as well as these peroxidic crosslinkers, further additions which can help to increase the crosslinking yield: Suitable examples thereof include triallyl isocyanurate, triallyl cyanurate, trimethylolpropane tri(meth)acrylate, triallyltrimellitate, ethylene glycol dimethacrylate, butanediol dimethacrylate, zinc diacrylate, zinc dimethacrylate, 1,2-polybutadiene or N,N'-m-phenylenebismaleimide.

The total amount of the crosslinker(s) is typically in the range from 1 to 20 phr, preferably in the range from 1.5 to 15 phr and more preferably in the range from 2 to 10 phr, based on the hydrogenated nitrile-butadiene-PEG acrylate copolymer.

Crosslinkers used may also be sulphur in elemental soluble or insoluble form, or sulphur donors.

Useful sulphur donors include, for example, dimorpholyl disulphide (DTDM), 2-morpholinodithiobenzothiazole (MBSS), caprolactam disulphide, dipentamethylenethiuram tetrasulphide (DPTT) and tetramethylthiuram disulphide (TMTD).

In the case of sulphur vulcanization of the hydrogenated nitrile-butadiene-PEG acrylate copolymer of the invention too, it is possible to use further additions which can help to increase the crosslinking yield. In principle, the crosslinking can also be effected with sulphur or sulphur donors alone.

Conversely, crosslinking of the hydrogenated nitrile-butadiene-PEG acrylate copolymers of the invention can alternatively be effected only in the presence of the abovementioned additions, i.e. without addition of elemental sulphur or sulphur donors.

Suitable additions which can help to increase the crosslinking yield are, for example, dithiocarbamates, thiurams, thiazoles, sulphenamides, xanthogenates, guanidine derivatives, caprolactams and thiourea derivatives.

Dithiocarbamates used may be, for example: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethyldithiocarbamate and zinc diisononyldithiocarbamate.

Thiurams used may be, for example: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

Thiazoles used may be, for example: 2-mercaptobenzothiazole (MBT), dibenzothiazyl disulphide (MBTS), zinc mercaptobenzothiazole (ZMBT) and copper 2-mercaptobenzothiazole.

Sulphenamide derivatives used may be, for example: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxydiethylenethiocarbamyl-N-tert-butylsulphenamide and oxydiethylenethiocarbamyl-N-oxyethylenesulphenamide.

Xanthogenates used may be, for example: sodium dibutylxanthogenate, zinc isopropyldibutylxanthogenate and zinc dibutylxanthogenate.

Guanidine derivatives used may be, for example: diphenylguanidine (DPG), di-o-tolylguanidine (DOTG) and o-tolylbiguanide (OTBG).

Dithiophosphates used may be, for example: zinc dialkyldithiophosphates (chain length of the alkyl radicals $C_2$ to $C_{16}$), copper dialkyldithiophosphates (chain length of the alkyl radicals $C_2$ to $C_{16}$) and dithiophosphoryl polysulphide.

A caprolactam used may be, for example, dithiobiscaprolactam.

Thiourea derivatives used may be, for example, N,N'-diphenylthiourea (DPTU), diethylthiourea (DETU) and ethylenethiourea (ETU).

Likewise suitable as additions are, for example: zinc diaminediisocyanate, hexamethylenetetramine, 1,3-bis(citraconimidomethyl)benzene and cyclic disulphanes.

The additions and also the crosslinking agents mentioned can be used either individually or in mixtures. Preference is given to using the following substances for the crosslinking of the hydrogenated nitrile-butadiene-PEG acrylate copolymers: sulphur, 2-mercaptobenzothiazole, tetramethylthiuram disulphide, tetramethylthiuram monosulphide, zinc dibenzyldithiocarbamate, dipentamethylenethiuram tetrasulphide, zinc dialkyldithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinking agents and aforementioned additions can each be used in amounts of 0.05 phr to 10 phr, preferably 0.1 phr to 8 phr, especially 0.5 phr to 5 phr (single dose, based in each case on the active substance), based on the hydrogenated nitrile-butadiene-PEG acrylate copolymer.

In the sulphur crosslinking, it may also be advisable, in addition to the crosslinking agents and the abovementioned additions, also to use further inorganic or organic substances as well, for example: zinc oxide, zinc carbonate, lead oxide, magnesium oxide, calcium oxide, saturated or unsaturated organic fatty acids and zinc salts thereof, polyalcohols, amino alcohols, for example triethanolamine, and amines, for example dibutylamine, dicyclohexylamine, cyclohexylethylamine, polyamines and polyether amines.

As ageing stabilizers in vulcanizable mixtures comprising hydrogenated nitrile-butadiene-PEG acrylate copolymers, all typically used ageing stabilizers are suitable, preferably phenolic or aminic ageing stabilizers.

Suitable phenolic ageing stabilizers are alkylated phenols, styrenized phenol, sterically hindered phenols such as 2,6-di-tert-butylphenol, 2,6-di-tert-butyl-p-cresol (BHT), 2,6-di-tert-butyl-4-ethylphenol, 2,2'-methylenebis(6-tert-butyl)-p-cresol, poly(dicyclopentadiene-co-p-cresol), sterically hindered phenols containing ester groups, such as n-octadecyl β-(4-hydroxy-3,5-di-tert-butylphenyl)propionate, thioether-containing sterically hindered phenols, 2,2'-methylenebis(4-methyl-6-tert-butylphenol) (BPH), 2-methyl-4,6-bis(octylsulphanylmethyl)phenol and sterically hindered thiobisphenols. In particularly suitable embodiments, two or more ageing stabilizers are also added, for example a mixture of octadecyl-3-(3,5-di-tert-butyl-4-hydroxyphenyl) propionate, poly(dicyclopentadiene-co-p-cresol) and 2-methyl-4,6-bis(octylsulphanylmethyl)phenol.

Process for Producing a Vulcanizable Mixtures Comprising Hydrogenated Nitrile-Butadiene-PEG Acrylate Copolymers The invention further provides a process for producing vulcanizable mixtures comprising hydrogenated nitrile-butadiene-PEG acrylate copolymer by mixing the hydrogenated nitrile-butadiene-PEG acrylate copolymer with at least one crosslinker and the further components optionally present. This mixing operation can be performed in all mixing units customary in the rubber industry, for example internal mixers, Banbury mixers or rollers. The sequence of metered addition can be determined without any problem by the person skilled in the art through suitable tests.

By way of example, two variants for the possible procedure are described hereinafter:

Process A: Production in an Internal Mixer

Preference is given to internal mixers with intermeshing rotor geometry.

At the start time, the internal mixer is charged with the hydrogenated nitrile-butadiene-PEG acrylate copolymer in bale form, and the bales are comminuted. After a suitable mixing period, the fillers and additives are added. The mixing is effected under temperature control, with the proviso that the mixture remains at a temperature in the range from 80° C. to 150° C. for a suitable time. After a further suitable mixing period, the further mixture constituents are added, such as optionally stearic acid, antioxidants, plasticizers, white pigments (for example titanium dioxide), dyes and other processing actives. After a further suitable mixing period, the internal mixer is vented and the shaft is cleaned. After a further suitable period, the internal mixer is emptied to obtain the vulcanizable mixture. Suitable periods are understood to mean a few seconds to a few minutes. The vulcanizable mixtures thus produced can be assessed in a customary manner, for instance by Mooney viscosity, by Mooney scorch or by a rheometer test.

Process B: Production on a Roll

If rolls are used as mixing units, it is possible to proceed in on analogous manner and sequence in the metered addition.

Process for Producing Vulcanizates Comprising Hydrogenated Nitrile-Butadiene-PEG Acrylate Copolymer The invention further provides the process for producing vulcanizates comprising hydrogenated nitrile-butadiene-PEG acrylate copolymer (vulcanization), characterized in that the vulcanizable mixtures comprising hydrogenated nitrile-butadiene-PEG acrylate copolymer are subjected to vulcanization, preferably at temperatures in the range from 100° C. to 250° C., more preferably at temperatures in the range from 120° C. to 250° C. and most preferably temperatures in the range from 130° C. to 250° C. For this purpose, the vulcanizable mixtures are processed further with calenders, rolls or extruders. The preformed mass is then vulcanized in presses, autoclaves, hot air systems or in what are called automatic mat vulcanization systems ("Auma"), and preferred temperatures have been found to be in the range from 100° C. to 250° C., particularly preferred temperatures in the range from 120° C. to 250° C. and very particularly preferred temperatures in the range from 130° C. to 250° C. The vulcanization time is typically 1 minute to 24 hours and preferably 2 minutes to 1 hour. Depending on the shape and size of the vulcanizates, a second vulcanization by reheating may be necessary to achieve complete vulcanization.

The invention further provides the vulcanizates thus obtainable, based on hydrogenated nitrile-butadiene-PEG acrylate copolymer.

The invention also provides for the use of the vulcanizates based on hydrogenated nitrile-butadiene-PEG acrylate copolymer of the invention for production of mouldings selected from the group consisting of seals, rollers, shoe components, hoses, damping elements, stators and cable sheaths, preferably seals.

The invention thus provides mouldings selected from the group consisting of seals, rollers, shoe components, hoses, damping elements, stators and cable sheaths, preferably seals, based on hydrogenated nitrile-butadiene-PEG acrylate copolymer of the invention. The methods usable by way of example for this purpose such as moulding, injection moulding or extrusion processes, and the corresponding injection moulding apparatuses or extruders, are sufficiently well known to those skilled in the art. In the production of these mouldings, it is possible to supplement the hydrogenated nitrile-butadiene-PEG acrylate copolymers of the invention with the standard auxiliaries which are known to those skilled in the art and have to be suitably selected using customary art knowledge, for example fillers, filler-activators, accelerators, crosslinkers, antiozonants, antioxidants, processing oils, extender oils, plasticizers, activators or scorch inhibitors.

The particular advantage of the invention is that the hydrogenated nitrile-butadiene-PEG acrylate copolymer of the invention has a TR 10 of −25° C. or less, swelling in Fuel C of 50% or less, and a compression set at −20° C. of 50% or less.

EXAMPLES

Test Methods:

The RDB content (residual double bond content) in % is determined by the following FT-IR measurement: the IR spectra of the nitrile-butadiene-PEG acrylate copolymer before, during and after the hydrogenation are recorded by means of an IR instrument of the Thermo Nicolet FT-IR spectrometer, AVATAR 360 type. For this purpose, a monochlorobenzene solution of the nitrile-butadiene-PEG acrylate copolymer is applied to an NaCl disc, dried to a film and analysed. The hydrogenation level is determined by means of FT-IR analysis by the ASTM D 567095 method.

The Mooney viscosity values (ML1+4@100° C.) are determined in each case by means of a shearing disc viscometer in accordance with ASTM D1646-07.

The molecular weight is determined by gel permeation chromatography (GPC). A modular system was used, having a Shodex RI-71 differential refractometer, S 5200 autosampler (from SFD), column oven (ERC-125), Shimadzu LC 10 AT pump and a column combination of 3 PLgel 10 μm Mixed B 300×7.5 mm columns from Agilent. The solvent used was tetrahydrofuran; the molecular weights present are based on polystyrene standards from PSS (Mainz). The finished THF sample solutions are filtered through syringe filters having 0.45 μm PTFE membranes and diameter 25 mm. The measurements were conducted at 40° C. and a flow rate of 1 ml/min in tetrahydrofuran.

The molecular parameters such as number-average molecular weight $M_n$, mass-average molecular weight $M_w$ and the resulting polydispersity index PDI are determined from the RI signal by means of the "Empower 2 data base" software from Waters.

The nitrogen content for determination of the ACN content in the copolymer rubbers containing nitrile groups is determined by Varlo EL cube. Combustion of the sample weighed out in the CHN machine at about 1150° C. in the presence of oxidation catalysts and oxygen, aliquoting of the combustion gases, absorption of the disruptive components and detection of $N_2$ by thermal conductivity measurement cell (TCD).

The determination of the microstructure and the termonomer content of the individual polymers was effected by means of 1H NMR (instrument: Bruker DPX400 with TopSpin 1.3 software, measurement frequency 400 MHz, solvent: 1,1,2,2-tetrachloroethane-d2).

Crosslinking density was determined with a moving die rheometer (MDR 2000E), measuring at an angle of 0.5° and an oscillation frequency of 1.7 Hz at 180° C. for 30 minutes.

For the tensile testing, 2 mm plaques were produced by vulcanization of the vulcanizable mixture at 180° C. The dumbbell-shaped test specimens were punched out of these plaques and tensile strength and elongation were determined to ASTM D2240-81.

Hardness was determined with a durometer to ASTM D2240-81.

The glass transition temperature was obtained with the aid of a DSC measurement in accordance with ASTM E 1356-03 or in accordance with DIN 11357-2. For this purpose, between 10 mg and 15 mg of the sample were weighed into an aluminium pan and sealed. The pan was heated up twice from −150° C. to 150° C. at a heating rate of 10 K/min in a DSC instrument from TA Instruments. The glass transition temperature was determined from the second heating curve by the standard method for finding the mean value.

Swelling: To determine the swelling, dumbbell-shaped test specimens as used for the tensile testing were stored in Fuel C according to DIN ISO 1817 in a closed pressure vessel at 60° C. for 70 h. Thereafter, the samples were measured and weighed, and the volume swelling and increase in mass were determined. Subsequently, tensile strength and elongation were determined to ASTM D2240-81.

TR 10 measurement: The TR measurement was conducted in accordance with ISO 2921, 2005. For this purpose, the sample was stored at −70° C. in silicone oil for 10 minutes.

Subsequently, the curve was recorded at 1° C./min and the temperature for a 10% change was read off.

CS measurement: The measurement of compression set at −20° C. was conducted to DIN ISO 815-2.

The abbreviations given in the tables below have the following meanings:

"RT" room temperature (23±2° C.)
"S min" is the minimum torque of the crosslinking isotherm
"S max" is the maximum torque of the crosslinking isotherm
"delta S" is "S max–S min"
"TS1" is the time by which the Mooney viscosity has increased by one unit after the Mooney viscosity minimum has been attained, compared to the starting point
"TS2" is the time by which the Mooney viscosity has increased by two units after the Mooney viscosity minimum has been attained, compared to the starting point
"t 50" is the time when 50% of S max has been attained
"t 90" is the time when 90% of S max has been attained
"t 95" is the time when 95% of S max has been attained
"M 10" modulus at 10% elongation, measured at RT "M 25" modulus at 25% elongation, measured at RT
"M 50" modulus at 50% elongation, measured at RT
"M 100" modulus at 100% elongation, measured at RT
"M 300" modulus at 300% elongation, measured at RT
"EB" elongation at break, measured at RT
"TS" tensile strength, measured at RT
"H" hardness, measured at RT The Following Substances were Used in the Examples:

The following chemicals were purchased as commercial products from the companies specified in each case, or originate from production plants of the companies specified.

For the Polymerization:

| | |
|---|---|
| "Premix solution Fe(II)SO₄" | contains 0.986 g of Fe(II)SO₄*7 H₂O and 2.0 g of Rongalit ® C in 400 g of water |
| Rongalit C ® | sodium salt of a sulphinic acid derivative (commercial product from BASF SE) |
| t-DDM | tertiary dodecyl mercaptan (commercial product from LANXESS Deutschland GmbH) |
| Disponil ® SDS G | sodium laurylsulphate (commercial product from BASF) |
| Glidox ® 500 | pinane hydroperoxide (commercial product from Renessenz) |
| Na salt of disproportionated resin acid | CAS 61790-51-0 |
| PEG-3-MA | ethoxy triethylene glycol methacrylate, molecular weight 246.3 g/mol, Evonik industries AG |
| PEG-8-MA | methoxy polyethylene glycol methacrylate, molecular weight 430 g/mol, Sartomer Europe |
| Na₂CO₃ | commercial product from Merck KGaA |
| Diethylhydroxyl-amine | commercial product from Merck KGaA |
| Vulkanox ® BKF | 2,2'-methylenebis(4-methyl-6-tert-butyl-phenol) (commercial product from LANXESS Deutschland GmbH) |

Substances Used in the Vulcanizable Composition:

| | |
|---|---|
| Vulkasil ® A1 | sodium aluminium silicate, commercially available from LANXESS Deutschland GmbH |
| Polestar ® 200R | calcined alumina, commercially available from Imerys |
| Uniplex 546 | trioctyl trimellitate, commercially available from LANXESS Deutschland GmbH |
| Luvomaxx ® CDPA | a 70% masterbatch based on alkylated diphenylamine, manufactured by Lehmann and Voss |
| Vulkanox ® ZMB2/C5 | zinc salt of 4- and 5-methyl-2 mercaptobenzothiazole, commercially available from LANXESS Deutschland GmbH |
| Perkadox ® 14-40 | di(tert-butylperoxyisopropyl)benzene 40% supported on silica, commercially available from Akzo Nobel Polymer Chemicals BV |
| TAIC | triallyl isocyanurate, 70% masterbatch, commercially available from Kettlitz Chemie GmbH & Co KG. |
| Maglite ® | magnesium oxide, commercially available from CP Hall. |
| Zinkoxid activ | zinc oxide, commercially available from LANXESS Deutschland GmbH |
| Silquest RC1 | organosilane, commercially available from Momentive Performance Materials |

I Preparation of the Nitrile-Butadiene-PEG Acrylate Copolymers (PEG-NBR 1-5) and of the Nitrile-Butadiene-Butyl Acrylate Copolymer (BA-NBR 6)

PEG-NBR 1 to 5 as used in the example series which follow were produced according to the base formulation specified in Table 1, with all feedstocks stated in % by weight based on 100% by weight of the monomer mixture. Table 1 also gives the particular polymerization conditions (temperature, conversion and time).

TABLE 1

Preparation of the nitrile-butadiene-PEG acrylate copolymers (PEG-NBR 1-5)
(inventive examples are identified by an asterisk *)

| | PEG-NBR | | | | |
|---|---|---|---|---|---|
| | 1* | 2 | 3* | 4 | 5* |
| Acrylonitrile (total/increment**) | 36/9 | 36/9 | 34/9 | 32/9 | 29/9 |
| 1,3-Butadiene | 44 | 53 | 51 | 56 | 46 |
| Ethoxy triethylene glycol methacrylate (PEG-3-MA) | 18 | 11 | 15 | | 25 |
| Methoxy octaethylene glycol methacrylate PEG-8-MA | | | | 12 | |
| Total amount of water | 190 | 190 | 190 | 190 | 190 |
| Disponil ® SDS G | 2.4 | 2.4 | 2.4 | 2.4 | 2.4 |
| Na salt of the disproportionated resin acid | 0.5 | 0.5 | 0.5 | 0.5 | 0.5 |
| Na₂CO₃ | 0.12 | 0.12 | 0.12 | | 0.12 |
| pH | 7.5 ± 0.5 | 7.5 ± 0.5 | 7.5 ± 0.5 | 7.5 ± 0.5 | 7.5 ± 0.5 |
| t-DDM | 0.575 | 0.575 | 0.58 | 0.53 | 0.48 |

TABLE 1-continued

Preparation of the nitrile-butadiene-PEG acrylate copolymers (PEG-NBR 1-5)
(inventive examples are identified by an asterisk *)

| | PEG-NBR | | | | |
|---|---|---|---|---|---|
| | 1* | 2 | 3* | 4 | 5* |
| Glidox ® 500 | 0.02 | 0.02 | 0.02 | 0.02 | 0.02 |
| Premix solution $FeSO_4$ | 0.022 | 0.022 | 0.023 | 0.033 | 0.015 |
| Diethylhydroxylamine | 0.2 | 0.2 | 0.2 | 0.2 | 0.2 |
| Vulkanox ® BKF | 0.1 | 0.1 | 0.1 | 0.1 | 0.1 |
| Polymerization temperature [° C.] | 12 ± 0.5 | 12 ± 0.5 | 12 ± 0.5 | 12 ± 0.5 | 12 ± 0.5 |
| Polymerization conversion [%] | 80.1 | 73.6 | 78.1 | 75.7 | 72.7 |
| Polymerization time [h] | 6.38 | 4.38 | 7.5 | 6.75 | 6.38 |

**The addition of the increment was done at a monomer conversion of 33%.

The nitrile-butadiene-PEG acrylate copolymers were prepared batchwise in a 20 l autoclave (PEG-NBR5) or 5 l autoclave (PEG-NBR1, PEG-NBR2, PEG-NBR3, PEG-NBR4) with stirrer system. In each of the autoclave batches, 4.73 kg (PEG-NBR5) or 1.18 kg (PEG-NBR1, PEG-NBR2, PEG-NBR3 and PEG-NBR4) of the monomer mixture and a total amount of water of 10 kg (PEG-NBR5) or 2.51 kg (PEG-NBR1, PEG-NBR2, PEG-NBR3, PEG-NBR4) were used, as was EDTA in an equimolar amount based on the Fe(II). Of this amount of water, 2.25 kg (PEG-NBR1, PEG-NBR2, PEG-NBR3, PEG-NBR4) or 9 kg (PEG-NBR5) were initially charged in the autoclave together with the emulsifier and purged with a nitrogen stream. Thereafter, the monomers and the amount of the t-DDM molecular weight regulator specified in Table 1 were added and the reactor was closed. After the reactor contents had been brought to temperature, the polymerizations were started by the addition of the premix solutions and of pinnae hydroperoxid (Glidox® 500).

The course of the polymerization was monitored by gravimetric determinations of conversion. On attainment of the conversions reported in Table 1, the polymerization was stopped by adding an aqueous solution of diethylhydroxylamine. Unconverted monomers and other volatile constituents were removed by means of steam distillation.

Prior to the coagulation of the respective NBR latex, a 45% dispersion of Vulkanox® BKF (0.1 wt.-% Vulkanox® BKF based on NBR solid) was added. The mixture was then coagulated with $CaCl_2$, washed and the obtained crumbs were dried.

The dried PEG-NBR rubbers were characterized by the Mooney viscosity, the ACN content and the glass transition temperature, and the content of the termonomers was determined by 1H NMR analysis (Table 2).

TABLE 2

Properties of the nitrile-butadiene-PEG acrylate copolymers
(PEG-NBR 1-5) (inventive examples identified by an asterisk *)

| | PEG-NBR/BA-NBR | | | | |
|---|---|---|---|---|---|
| | 1* | 2 | 3* | 4 | 5* |
| ACN content [% by wt.] | 32.2 | 32.6 | 32.2 | 31.7 | 25.6 |
| BD content [% by wt.] | 53.4 | 58.7 | 55.9 | 61.9 | 52.4 |
| PEG-3-MA [% by wt.] | 14.4 | 8.7 | 11.9 | | 22 |
| PEG-8-MA [% by wt.] | | | | 6.4 | |
| Mooney viscosity ML (1 + 4@100° C.) | 44 | 50 | 29 | 23 | 29 |
| Glass transition temperature Tg of crude polymer [° C.] | −27.1 | −26.8 | −25.5 | −28.3 | −31.8 |

PEG-NBR1, PEG-NBR2 and PEG-NBR3 differ in terms of the amount of copolymerized PEG-3-MA monomers, with a constant amount of acrylonitrile monomers.

II Preparation of the Hydrogenated Nitrile-Butadiene-PEG Acrylate Copolymers (PEG-HNBR 1 to 5)

Procedure for the Hydrogenations

The hydrogenations which follow were conducted using the previously synthesized nitrile-butadiene-PEG acrylate copolymers (PEG-NBR 1 to 5) and the nitrile-butadiene-butyl acrylate copolymer (BA-NBR 6)

Dry monochlorobenzene (MCB) was sourced from VWR, Wilkinson catalyst from Materia Inc. and triphenylphosphine from VWR, and these were used as obtained. The results of the hydrogenation experiments are compiled in Table 2.

Hydrogenations 1-5 were conducted in a 10 l high-pressure reactor under the following conditions:
Solvent: monochlorobenzene
Solids concentration: 12%-13% by weight of PEG-NBR terpolymer MCB (518 g)
Reactor temperature: 137-140° C.
Reaction time: up to 4 hours
Catalyst & loading: Wilkinson catalyst: 0.337 g (0.065 phr); Co-catalyst: triphenylphosphine: 5.18 g (1.0 phr)
Hydrogen pressure (p $H_2$): 8.4 MPa
Stirrer speed: 600 rpm The polymer solution containing PEG-NBR is degassed 3 times with $H_2$ (23° C., 2 MPa) under vigorous stirring. The temperature of the reactor was raised to 100° C. and the $H_2$ pressure to 6 MPa. 123.9 g of a chlorobenzene solution consisting of Wilkinson catalyst (0.337 g) and triphenylphosphine (5.18 g) were added and the pressure was raised to 8.4 MPa, while the reactor temperature was adjusted to 137-140° C. Both parameters were kept constant during the reaction. The course of the reaction was monitored by means of measurement of the residual double bond content (RDB) of the nitrile-butadiene-PEG acrylate copolymer by means of IR spectroscopy. The reaction was ended after not more than 4 hours and/or attainment of an RDB content of <1% by releasing the hydrogen pressure.

The hydrogenated PEG-HNBR thus formed was isolated from the solution by means of steam coagulation. For this purpose, the chlorobenzene solution was diluted to a polymer content of 7% by weight and metered continuously into a stirred, water-filled glass reactor preheated to 100° C. At the same time, 0.5 bar steam was used for introduction into the coagulation water. The polymer crumbs thus precipitated were roughly dewatered and then dried to constant weight at 55° C. under reduced pressure.

TABLE 3

Properties of the hydrogenated nitrile-butadiene-PEG acrylate copolymers (PEG-HNBR 1 to 5) (inventive examples are identified by an asterisk *)

|  | PEG-1-HNBR/BA-HNBR | | | | |
|---|---|---|---|---|---|
|  | 1* | 2 | 3* | 4 | 5* |
|  | | | PEG-NBR | | |
|  | 1* | 2 | 3* | 4 | 5* |
| RDB [%] | <0.5 | <0.5 | 6.2 | <0.5 | 5.7 |
| Mooney viscosity ML(1 + 4@100° C.) | 145 | 161 | n.d. | 79 | n.d. |
| Glass transition temperature Tg of crude polymer [° C.] | −30.5 | −28.6 | −29.5 | −27.3 | −35.1 |

III Production of Vulcanizates of the Hydrogenated Nitrile-Butadiene-PEG Acrylate Copolymers (PEG-HNBR 1 to 5) and of the Hydrogenated Nitrile-Butadiene-Butyl Acrylate Copolymer (BA-HNBR 6):

Production of the Vulcanizable Mixtures:

Nitrile-Butadiene Copolymer Components:

PEG-HNBR 1

Hydrogenated nitrile-butadiene-PEG acrylate copolymer, prepared as described above, having an acrylonitrile (ACN) content of 32.2% and a PEG-3-MA content of 14.4%, a residual double bond content of <0.5% and a Mooney viscosity (ML 1+4@100° C.) of 145±2 MU.

PEG-NHBR 2

Hydrogenated nitrile-butadiene-PEG acrylate copolymer, prepared as described above, having an acrylonitrile (ACN) content of 32.6% and a PEG-3-MA content of 8.7%, a residual double bond content of <0.5% and a Mooney viscosity (ML 1+4@100° C.) of 161±2 MU.

PEG-HNBR 3

Hydrogenated nitrile-butadiene-PEG acrylate copolymer, prepared as described above, having an acrylonitrile (ACN) content of 32.2% and a PEG-3-MA content of 11.9% with a residual double bond content of 6.2%±0.5%.

PEG-HNBR 4

Hydrogenated nitrile-butadiene-PEG acrylate copolymer, prepared as described above, having an acrylonitrile (ACN) content of 25.6% and a PEG-8-MA content of 6.4%, a residual double bond content of <0.5% and a Mooney viscosity (ML 1+4@100° C.) of 79±2 MU.

PEG-HNBR 5

Hydrogenated nitrile-butadiene-PEG acrylate copolymer, prepared as described above, having an acrylonitrile (ACN) content of 26% and a PEG-3-MA content of 22%, a residual double bond content of 5.7%±0.5%.

BA-HNBR 6

Commercially available nitrile-butadiene-butyl acrylate copolymer (Therban LT 2568 VP from LANXESS Deutschland GmbH), having an acrylonitrile (ACN) content of 25%, a residual double bond content of 5.1%±0.5% and a Mooney viscosity (ML 1+4@100° C.) of 80±2 MU.

TABLE 4

Composition of the vulcanizable mixtures (inventive examples are identified with an asterisk *)

| Example Nitrile-butadiene copolymer | V1* parts | V2 parts | V3* parts | V4 parts | V5* parts | V6 parts |
|---|---|---|---|---|---|---|
| PEG-HNBR 1 | 100 | | | | | |
| PEG-HNBR 2 | | 100 | | | | |
| PEG-HNBR 3 | | | 100 | | | |
| PEG-HNBR 4 | | | | 100 | | |
| PEG-HNBR 5 | | | | | 100 | |
| BA-HNBR | | | | | | 100 |
| Other components | phr | phr | phr | phr | phr | phr |
| Vulkasil A1 | 20 | 20 | 20 | 20 | 20 | 20 |
| Polestar 200R | 80 | 80 | 80 | 80 | 80 | 80 |
| TOTM | 10 | 10 | 10 | 10 | 10 | 10 |
| Luvomaxx CDPA | 1.4 | 1.4 | 1.4 | 1.4 | 1.4 | 1.4 |
| VULKANOX ZMB2/C5 | 0.4 | 0.4 | 0.4 | 0.4 | 0.4 | 0.4 |
| PERKADOX 14-40 | 10 | 10 | 10 | 10 | 10 | 10 |
| TAIC 70% | 3 | 3 | 3 | 3 | 3 | 3 |
| MAGLITE | 2 | 2 | 2 | 2 | 2 | 2 |
| ZnO | 5 | 5 | 5 | 5 | 5 | 5 |

All vulcanizable mixtures were produced and silanized in a 375 ml kneader. The nitrile-butadiene copolymer was initially charged at 90° C. and mixed for about 1 minute. Subsequently, the fillers and chemicals were added. Once the temperature in the kneader had reached 145° C., mixing was effected at this temperature for 3 minutes in order to achieve silanization of the filler. Then the mixture was ejected after a total mixing time of 12-18 minutes.

TABLE 5

Crosslinking density of the vulcanizates:

| MDR at 180° C. | | V1 | V2 | V3* | V4 | V5* | V6 |
|---|---|---|---|---|---|---|---|
| S' min | dNm | 2.31 | 1.71 | 1.24 | 1.41 | 1.73 | 1.52 |
| S' max | dNm | 30 | 32 | 34 | 32 | 31 | 32 |
| S' end | dNm | 29 | 32 | 34 | 31 | 31 | 31 |
| Delta S' | dNm | 27 | 31 | 33 | 30 | 30 | 30 |
| TS 1 | s | 28 | 29 | 28 | 31 | 28 | 29 |
| TS 2 | s | 34 | 34 | 34 | 37 | 34 | 36 |
| t 50 | s | 60 | 62 | 62 | 67 | 60 | 68 |
| t 90 | s | 102 | 107 | 107 | 114 | 104 | 119 |
| t 95 | s | 265 | 291 | 282 | 303 | 292 | 319 |

The mouldings (slabs of thickness 2 mm) for the performance of the further determinations were produced by vulcanization at 180° C. for 10 minutes.

TABLE 6

Physical properties of the unaged vulcanizates

| Tensile test | | V1 | V2 | V3* | V4 | V5* | V6 |
|---|---|---|---|---|---|---|---|
| M 10 | MPa | 0.8 | 0.8 | 0.8 | 0.8 | 0.7 | 0.8 |
| M 25 | MPa | 1.9 | 1.8 | 1.8 | 1.9 | 1.8 | 2 |
| M 50 | MPa | 5.3 | 4.7 | 4.7 | 5.1 | 4.9 | 5.7 |
| M 100 | MPa | 13.1 | 12 | 12.6 | 12.6 | 12.3 | 14.4 |
| EB | % | 116 | 139 | 112 | 125 | 122 | 109 |
| TS | MPa | 15 | 15 | 14 | 15 | 14 | 15 |
| H | ShA | 73 | 71 | 75 | 73 | 73 | 73 |

TABLE 7

Ageing of the vulcanizates in Fuel C

| Tensile test | | V1* | V2 | V3* | V4 | V5* | V6 |
|---|---|---|---|---|---|---|---|
| | | Fuel C, 70 h at 60° C. | | | | | |
| M 10 | MPa | 0.6 | 0.7 | 0.7 | 0.9 | 0.7 | 0.8 |
| M 25 | MPa | 1.9 | 1.9 | 2.1 | 2.2 | 2.1 | 2.6 |

TABLE 7-continued

Ageing of the vulcanizates in Fuel C

| Tensile test | | V1* | V2 | V3* | V4 | V5* | V6 |
|---|---|---|---|---|---|---|---|
| M 50 | MPa | 5.7 | 5.3 | 6 | 5.9 | 6.2 | 7.1 |
| M 100 | MPa | — | — | — | — | — | — |
| EB | % | 70 | 79 | 66 | 72 | 65 | 57 |
| TS | MPa | 9 | 9 | 9 | 9 | 9 | 8 |
| H | ShA | 56 | 55 | 56 | 54 | 60 | 62 |

TABLE 8

Change after ageing (70 h at 60° C.) of the vulcanizates in Fuel C in %

| Change | | V1* | V2 | V3* | V4 | V5* | V6 |
|---|---|---|---|---|---|---|---|
| Fuel C, 70 h at 60° C. | | | | | | | |
| Δ EB | % | −40 | −43 | −41 | −42 | −47 | −48 |
| Δ TS | % | −41 | −38 | −38 | −40 | −41 | −47 |
| Δ H | % | −7 | −6 | −7 | −8 | −6 | −6 |
| Increase in mass | % | 24 | 26 | 26 | 28 | 27 | 33 |
| Increase in volume Δ V | % | 43 | 45 | 45 | 47 | 48 | 56 |

TABLE 9

CS and TR-10 of the unaged volcabizates

| | V1* | V2 | V3* | V4 | V5* | V6 |
|---|---|---|---|---|---|---|
| TR-10 | −29 | −29 | −30 | −28 | −34 | −30 |
| CS −20° C., 22 h | 43 | 60 | 27 | 83 | 19 | 20 |
| CS 150° C., 70 h | 36 | 22 | 21 | 21 | 25 | 18 |

The vulcanizates V1, V3 and V5 of the invention have both a TR-10 of −25° C. or less and a CS at −20° C. of 50% or less, and a ΔV of 50% or less.

Comparative vulcanizate V2 having a PEG-3-monomer content of less than 10% by weight has a poorer CS −20° C. of more than 50%.

Comparative vulcanizate V4 having too low a PEG-8 monomer content of less than 10% by weight has a worse CS at −20° C. of more than 50%.

Comparative vulcanizate V6 having BA monomers rather than PEG monomers has poorer swelling (=increase in volume) (see Table 9).

The particular advantage of the invention is that the hydrogenated nitrile-butadiene-PEG acrylate copolymer of the invention has
 a TR 10 of less than −25° C.,
 swelling in Fuel C of less than 50% and
 a compression set (CS) at −20° C. of less than 50%.

In terms of the combination of these properties, the novel polymers are superior to conventional hydrogenated nitrile-butadiene copolymers.

The invention claimed is:

1. A hydrogenated nitrile-butadiene-PEG acrylate copolymer comprising:
 a) 25% to 38% by weight of at least one α,β-ethylenically unsaturated nitrile unit,
 b) 40% to 60% by weight of at least one conjugated diene unit, wherein the at least one conjugated diene unit has a level of hydrogenation of at least 90% or more, and
 c) 10% to 25% by weight of at least one PEG acrylate unit derived from a PEG acrylate of the general formula (I)

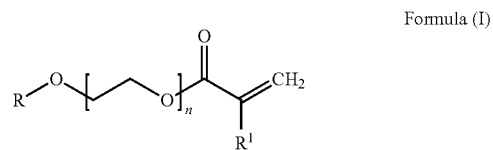

Formula (I)

where
 R is hydrogen, or branched or unbranched $C_1$-$C_{20}$-alkyl,
 n is 1 to 8, and
 $R^1$ is hydrogen or $CH_3$—,
where the hydrogenated nitrile-butadiene-PEG acrylate copolymer, if n is 1, does not contain any further copolymerizable monomer unit having a free carboxylic acid group.

2. The hydrogenated nitrile-butadiene-PEG acrylate copolymer according to claim 1, wherein the level of hydrogenation of the conjugated diene units (b) is 99% or more.

3. The hydrogenated nitrile-butadiene-PEG acrylate copolymer according to claim 1, wherein the α,β-ethylenically unsaturated nitrile unit (a) is acrylonitrile, methacrylonitrile, ethacrylonitrile or mixtures thereof.

4. The hydrogenated nitrile-butadiene-PEG acrylate copolymer according to claim 1, wherein the conjugated diene unit (b) is 1,3-butadiene, isoprene, 2,3-dimethylbutadiene, 1,3-pentadiene (piperylene), or mixtures thereof.

5. The hydrogenated nitrile-butadiene-PEG acrylate copolymer according to claim 1, wherein the PEG acrylate unit (c) is methoxy, ethoxy, butoxy or ethylhexoxy polyethylene glycol (meth)acrylate having 2 to 8 repeat ethylene glycol units.

6. A process for preparing the hydrogenated nitrile-butadiene-PEG acrylate copolymer according to claim 1, the process comprising:
 subjecting a mixture of the at least one α,β-ethylenically unsaturated nitrile, the at least one conjugated diene, and the at least one PEG acrylate of the general formula (I) to an emulsion polymerization to produce a polymer; and
 hydrogenating the polymer.

7. A vulcanizable mixture comprising the hydrogenated nitrile-butadiene-PEG acrylate copolymer according to claim 1 and at least one crosslinker.

8. A process for producing the vulcanizable mixture according to claim 7, the process comprising mixing the hydrogenated nitrile-butadiene-PEG acrylate copolymer with the at least one crosslinker.

9. A process for producing a vulcanizate based on hydrogenated nitrile-butadiene-PEG acrylate copolymer, the process comprising subjecting the vulcanizable mixture according to claim 7 to vulcanization at temperatures of 100° C. to 250° C.

10. A vulcanizate comprising the hydrogenated nitrile-butadiene-PEG acrylate copolymer according to claim 1.

11. A moulded article of manufacture produced by the process according to claim 9, the moulded article being selected from the group consisting of seals, rollers, shoe components, hoses, damping elements, stators, and cable sheaths.

12. A moulding comprising the hydrogenated nitrile-butadiene-PEG acrylate copolymers according to claim 1, the moulding being selected from the group consisting of seals, rollers, shoe components, hoses, damping elements, stators, and cable sheaths.

13. The hydrogenated nitrile-butadiene-PEG acrylate copolymer according to claim 1, wherein:
the copolymers comprise:
27% to 37% by weight of the at least one α,β-ethylenically unsaturated nitrile unit,
42% to 58% by weight of the at least one conjugated diene unit, and
11% to 22% by weight of the at least one PEG acrylate unit; and
n is 2 to 5.

14. The hydrogenated nitrile-butadiene-PEG acrylate copolymer according to claim 1, wherein:
the α,β-ethylenically unsaturated nitrile unit (a) is acrylonitrile, methacrylonitrile, ethacrylonitrile, or mixtures thereof;
the conjugated diene unit (b) is 1,3-butadiene, isoprene, 2,3-dimethylbutadiene, 1,3-pentadiene (piperylene), or mixtures thereof; and
the PEG acrylate unit (c) is methoxy, ethoxy, butoxy or ethylhexoxy polyethylene glycol (meth)acrylate having 2 to 8 repeat ethylene glycol units.

15. The hydrogenated nitrile-butadiene-PEG acrylate copolymer according to claim 14, wherein:
the copolymers comprise:
29% to 36% by weight of the at least one α,β-ethylenically unsaturated nitrile unit, wherein the α,β-ethylenically unsaturated nitrile unit is acrylonitrile;
44% to 56% by weight of the at least one conjugated diene unit, wherein the conjugated diene unit (b) is 1,3-butadiene; and
12% to 20% by weight of the at least one PEG acrylate unit, wherein the PEG acrylate unit (c) is methoxy or ethoxy polyethylene glycol (meth)acrylate having 3 repeat ethylene glycol units; and
the level of hydrogenation of the conjugated diene units (b) is 99% or more.

* * * * *